US008269877B2

(12) United States Patent
Kitaoka (10) Patent No.: US 8,269,877 B2
(45) Date of Patent: Sep. 18, 2012

(54) IMAGING APPARATUS AND FOREIGN OBJECT REMOVAL PROGRAM (75) Inventor: Naoki Kitaoka, Tokyo (JP)

(73) Assignee: Nikon Corporation, Tokyo (JP)

( * ) Notice: Subject to any disclaimer, the term of this patent is extended or adjusted under 35 U.S.C. 154(b) by 387 days.

(21) Appl. No.: 12/588,044

(22) Filed: Oct. 1, 2009

(65) Prior Publication Data

US 2010/0097701 A1 Apr. 22, 2010

(30) Foreign Application Priority Data

Oct. 22, 2008 (JP) ................................. 2008-272302

(51) Int. Cl.
*H04N 5/225* (2006.01)
*H04N 5/217* (2011.01)
*H04N 5/232* (2006.01)
*B60R 1/06* (2006.01)

(52) U.S. Cl. ........ 348/335; 348/241; 348/351; 348/374; 359/507

(58) Field of Classification Search ............. 348/208.99, 348/208.1, 208.2, 208.3, 208.4, 208.5, 208.6, 348/208.7, 208.12, 208.13, 208.16, 373, 348/374, 375, 241, 335, 351; 359/507
See application file for complete search history.

(56) References Cited

U.S. PATENT DOCUMENTS

| 7,969,500 | B2 * | 6/2011 | Urakami | 348/335 |
| 8,075,143 | B2 * | 12/2011 | Fujimoto | 359/507 |
| 8,125,120 | B2 * | 2/2012 | Okazaki | 310/317 |
| 2004/0047625 | A1 * | 3/2004 | Ito et al. | 396/429 |
| 2005/0280712 | A1 * | 12/2005 | Kawai | 348/207.99 |
| 2007/0292126 | A1 * | 12/2007 | Oshima | 396/429 |

FOREIGN PATENT DOCUMENTS

JP A-2006-293097 10/2006

* cited by examiner

*Primary Examiner* — Chieh M Fan
*Assistant Examiner* — Peter Chon
(74) *Attorney, Agent, or Firm* — Oliff & Berridge, PLC (57) ABSTRACT

An imaging apparatus having an imaging element which photoelectrically converts a photographic object image at a photoelectric conversion face, an optical member provided on a front face of the element and which forms an image of the object image on the face, an oscillation element which oscillates the member, an oscillation element driving means which makes the oscillation element oscillate according to each of oscillation modes having different oscillation forms, a foreign object specifying means which specifies a position of a foreign object attached to the optical member based on image data of a white screen imaged by the imaging element, and an oscillation control means which selects an oscillation mode where the foreign object is present at a peak portion of the oscillation form, based on the foreign object specified by the foreign object specifying means, and changes an oscillation condition of the oscillation mode.

4 Claims, 6 Drawing Sheets

IMAGING APPARATUS AND FOREIGN OBJECT REMOVAL PROGRAM

The present application claims priority under 35 U.S.C. §119 to Japanese Patent Application No. 2008-272302 filed on Oct. 22, 2008. The content of the application is incorporated herein by reference in its entirety.

BACKGROUND OF THE INVENTION

1. Field of the Invention

The present invention relates to an imaging apparatus provided with a function for removing contaminants, the shadow of which are imaged at the imaging element, by oscillations and to a foreign object removal program for the same.

2. Description of the Related Art

Previously, in interchangeable lens digital single lens reflex cameras, there was the problem that dust entering when changing lenses as well as wear particles which are generated from the driving parts inside the camera (below referred to as foreign objects) would attach to the surface of an optical member disposed at a front face of an imaging element, and the shadow of which would be taken in an image photographed by the imaging element.

Accordingly, a technique has been proposed to remove foreign objects, the shadow of which is imaged at the imaging element, by oscillating the optical member provided in front of the imaging element (for example, refer to Japanese Unexamined Patent Publication No. 2006-293097)

SUMMARY OF THE INVENTION

In the prior art for oscillating an optical member by a piezoelectric element, systems for oscillating the optical member by combining a plurality of oscillation modes of different resonance frequencies are typical. However, in the prior art, the oscillations according to oscillation modes of differing resonance frequencies are repeated with a fixed time and fixed cycle number regardless of the position of the attached foreign object, and therefore, it has been difficult to efficiently remove foreign objects.

The problem to be solved by the present invention is to provide an imaging apparatus which is capable of efficiently removing foreign objects attached to the surface of an optical member, and a foreign object removal program for the same.

The present invention solves the above problem by the following means.

In order to achieve the object mentioned above, according to a first aspect of the present invention, there is provided an imaging apparatus comprising, an imaging element which photoelectrically converts a photographic object image at a photoelectric conversion face, an optical member provided on a front face of the imaging element and which forms an image of the photographic object image on the photoelectric conversion face, an oscillation element which oscillates the optical member, an oscillation element driving means which makes the oscillation element oscillate according to each of a plurality of oscillation modes having different oscillation forms, a foreign object specifying means which specifies a position of a foreign object attached to the optical member based on image data of a white screen imaged by the imaging element, and an oscillation control means which selects an oscillation mode where the foreign object is present at a peak portion of the oscillation form, based on the foreign object specified by the foreign object specifying means, and changes an oscillation condition of the oscillation mode.

The oscillation control means may change at least one of a driving cycle number and a driving voltage according to a resonance frequency of the driving mode, as the oscillation condition of the selected oscillation mode.

The oscillation control means, based on the position of the foreign object specified by the foreign object specifying means, may change the oscillation condition of the oscillation mode where the foreign object is present at the peak portion of the oscillation form, and may not change the oscillation condition of an oscillation mode where the foreign object is not present at the peak portion of the oscillation form.

In order to achieve the object mentioned above, according to a second aspect of the present invention, there is provided a foreign object removal program of an imaging apparatus comprising an imaging element which photoelectrically converts a photographic object image at a photoelectric conversion face, an optical member provided at a front face of the imaging element and which forms an image of the photographic object image on the photoelectric conversion face, an oscillation element which oscillates the optical member, an oscillation element driving means which makes the oscillation element oscillate according to each of a plurality of oscillation modes having different oscillation forms, and a control portion, wherein the control portion executes the steps of: a foreign object specifying step which specifies a position of a foreign object attached to the optical member based on image data of a white screen imaged by the imaging element, and an oscillation control step which selects an oscillation mode where the foreign object is present at a peak portion of the oscillation form and changes an oscillation condition of the oscillation mode.

Furthermore, the above constitution can be suitably improved, or at least a part thereof may be substituted by other constituents.

According to the present invention, it is possible to provide an imaging apparatus which can efficiently remove foreign objects attached to a surface of an optical member, and a foreign object removal program for the same.

DETAILED DESCRIPTION OF THE INVENTION

Figure 1:
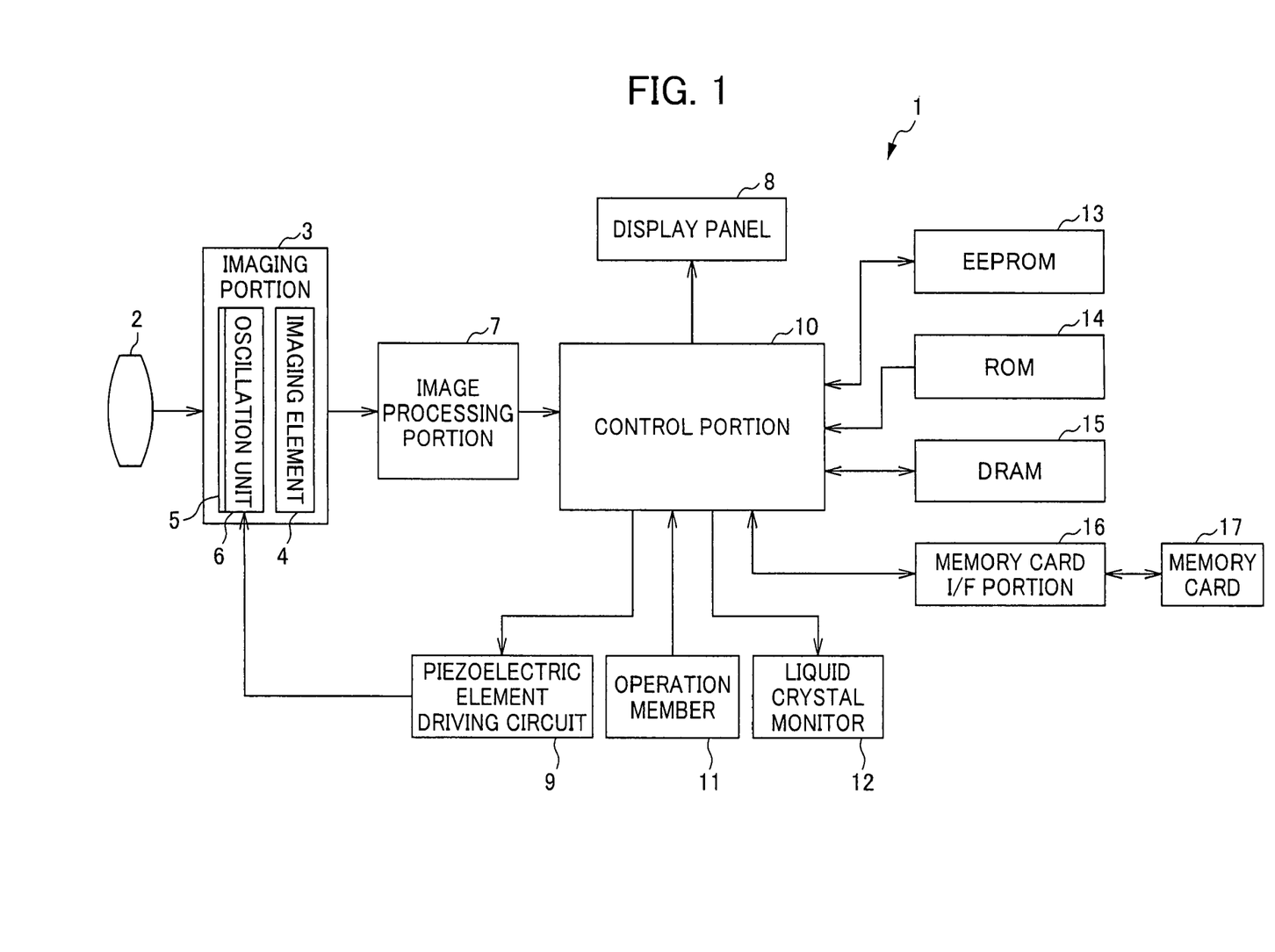
FIG. 1 is a block diagram showing the constitution of the camera of an embodiment.

Below, embodiments of an imaging apparatus according to the present invention, and a foreign object removal program for the same, are explained with reference to the drawings. Herein, explanations are given for embodiments for the case of applying the present invention to a digital camera. FIG. 1 is a block diagram of the constitution of a digital camera 1 according to the present embodiment. Below, each portion is explained.

The photographic lens 2 is an optical system for refracting incident photographic object light and outputting it to the imaging portion 3 side, and the intensity of the photographic object light is adjusted by a diaphragm unit, not shown in the figures.

The imaging portion 3 is a circuit which images the photographic object light output from the photographic lens 2, exposes the photographic object light, electrically converts it to an image signal, and outputs it to the image processing portion 7. This imaging portion 3 is provided with an imaging element 4, an optical member 5, and an oscillation unit 6.

The imaging element 4 is a portion which photoelectrically converts the subject image at a photoelectric conversion face, and is constituted of a CCD, CMOS or the like disposed in a planar form. The optical member 5 is provided at the front face of the imaging element 4, and forms an image of the photographic object image on the photoelectric conversion face of the imaging element 4, and provides spectral characteristics and filtering characteristics for the photographic object light. This optical member 5 is constituted of a plurality of sheets of crystal plates and a filter or the like.

Figure 2:
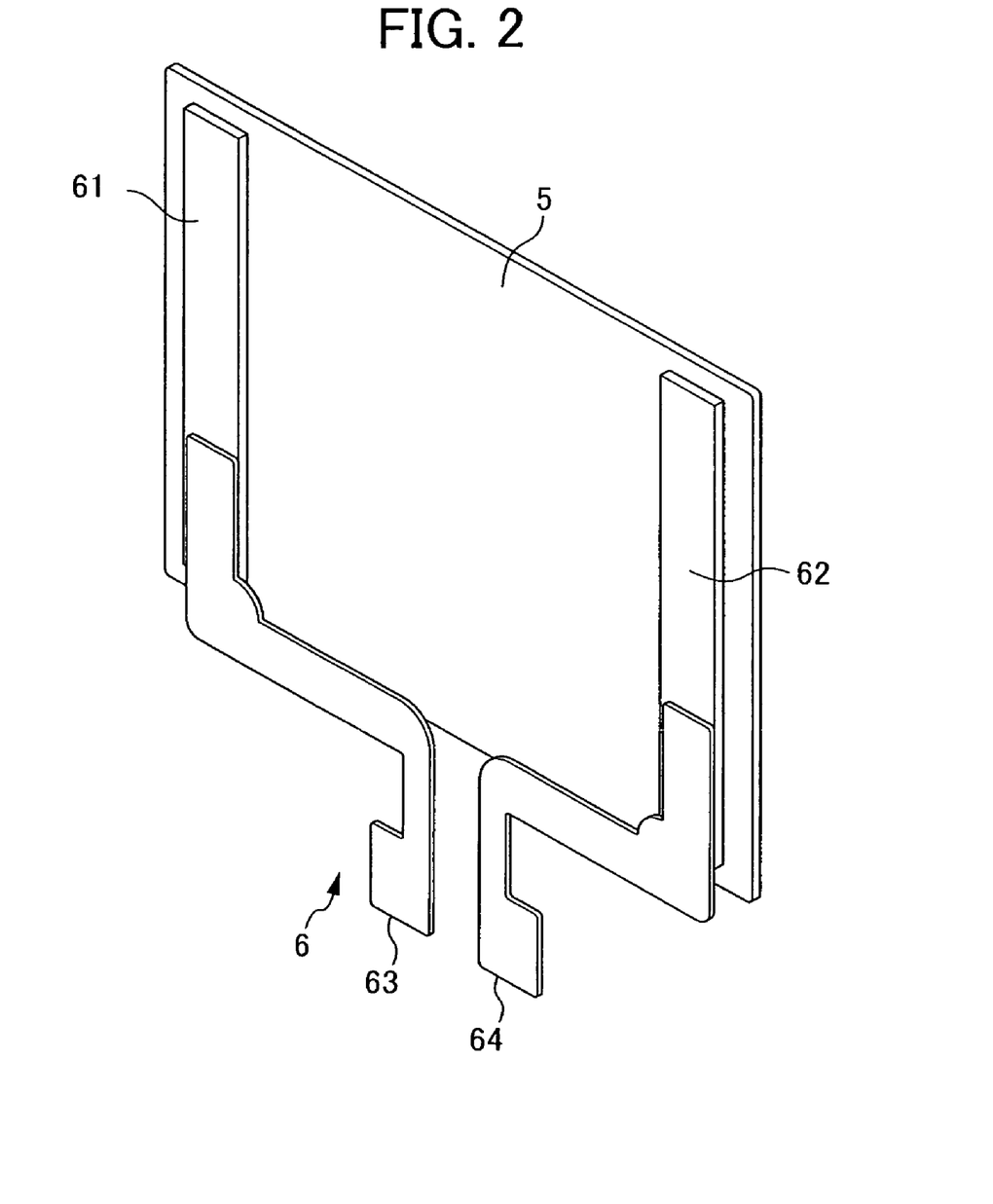
FIG. 2 is an oblique view showing the constitution of the oscillation unit.

The oscillation unit 6 is an oscillation generating means which makes the optical member 5 oscillate by oscillating by the application of a voltage. FIG. 2 is an oblique view showing the constitution of the oscillation unit 6. The oscillation unit 6 of the present embodiment, at both left and right end portions of the front face sides of the optical member 5, provides a pair of piezoelectric elements 61, 62 as oscillation elements which oscillate the optical member 5. Each piezoelectric element is formed in a planar shape, and is affixed by adhering to both left and right end portions outside the effective imaging region at the optical member 5.

Further, the end portions of the piezoelectric members 61 and 62 are connected to the flexible printed boards 63, 64. These flexible printed boards 63, 64 are electrically connected to the piezoelectric element driving circuit 9 (FIG. 1), and an alternating voltage of the resonant frequency according to the oscillation mode is applied from this piezoelectric driving circuit 9.

When an alternating voltage of a specified frequency (the resonant frequency of the optical member 5) is applied to the piezoelectric elements 61, 62, the optical member 5 resonates along with the oscillations of the piezoelectric elements 61, 62, and oscillations of the optical member 5 are generated. Foreign objects attached to the surface of the optical member 5 are removed by these oscillations. Further, the oscillation modes and oscillation forms are described below.

The image processing portion 7 carries out the analog and digital processing of the noise removal, A/D conversion, color correction processing, size conversion, encoding and the like for the image signal output by the imaging portion 3, and produces the final image data. This image data is temporarily stored in a DRAM 15.

The display panel 8 is a black and white liquid crystal display panel disposed on the upper face of the camera 1, and displays photographic information such as the photography mode, diaphragm value, shutter speed and the like.

The piezoelectric element driving circuit 9 applies a voltage of the frequency corresponding to each oscillation mode to the above described oscillation unit 6. Accordingly, the piezoelectric element driving circuit 9 functions as an oscillation element driving means for making the piezoelectric elements oscillate according to each of a plurality of oscillation modes having different oscillation forms.

The control portion 10 is a circuit which controls the operation of the camera 1 as a whole, and is constituted of a microprocessor.

This control portion 10 calculates the lens driving amount for focus adjustment, drives the in-lens motor or in-body motor, not shown in the drawings, to move a portion of the photographic lens 2 along the optical axis, and carries out focus adjustment. Further, it calculates an appropriate exposure value based on the photography mode set by the user and the sensitivity information input from the sensitivity setting portion, not shown in the drawings, in addition to the luminance of the photographic object light and lens information such as the type of the photographic lens 2, the aperture F value, the focal length and the like. It then selects a diaphragm value and shutter speed value according to this exposure value, and carries out exposure control by driving the diaphragm unit and shutter unit, not shown in the drawings.

Further, when a foreign object removal process is selected by an operation by the user, the control portion 10 functions as a foreign object specifying means specifying the position of a foreign object attached to the optical member 5, based on the image data of a white screen photographed by the imaging element 4. Further, the control portion 10 functions as an oscillation control means selecting an oscillation mode where this foreign object is present at a peak portion of the oscillation form and changing the oscillation conditions of this oscillation mode, based on the position of the specified foreign object. In the present embodiments, as the oscillation form of the oscillation mode, in the later described Embodiment 1, the driving cycle number of the oscillation unit 6 is changed, and in Embodiment 2, the driving voltage is changed. Further, in all of the embodiments, only the oscillation conditions of the oscillation modes where a foreign object is present at a peak portion of the oscillation form is changed, and the oscillation conditions of oscillation modes where a foreign object is not present at a peak portion of the oscillation form are not changed. Further, the specification of the position of a foreign object, and the selection of an oscillation mode where the specified foreign object is present at a peak portion of the oscillation form are explained later.

The operation member 11 is an operation input means for the user to give various commands to the control portion 10, and is constituted of dials, buttons, levers and the like not shown in the drawings.

The liquid crystal monitor 12 is a color liquid crystal display disposed at the back face of the camera 1. This liquid crystal monitor 12, in addition to displaying the same photographic information as the display panel 8 such as the photography mode, diaphragm value, shutter speed and the like, also displays a menu screen, a mode setting screen, a photographed image (playback image), and moving images including live view images. A user may select the foreign object removal process from the menu screen displayed on the liquid crystal monitor 12.

The EEPROM 13 is a nonvolatile memory which retains information stored even when the power of the camera 1 is switched off, and stores input information such as the user settings, custom settings, and the like. This EEPROM 13, in the later described Embodiment 1, stores the basic driving cycle numbers NA0, NB0 and NC0, and the actual driving cycle numbers NA, NB, and NC. Further, in Embodiment 2, it stores the basic driving voltages VA0, VB0 and VC0, and the actual driving voltages VA, VB, and VC.

The ROM 14, in addition to the programs necessary for control and operation of the camera 1, also stores the initial values and the set values necessary for executing these programs.

The DRAM 15 is a volatile memory where the stored information is deleted when the power of the camera 1 is switched off, and in addition to the later described image data, also temporarily stores the data necessary when executing processing by the image processing portion 7 and the control portion 10 and the like.

The memory card I/F (interface) portion 16 is a write/read device provided with the functions of recording the image data stored in the DRAM 15 to a memory card 17, and also reading out the image data recorded in the memory card 17. A memory card 17 can be freely and removably inserted into a memory card slot, not shown in the drawings, of this memory card I/F portion 16.

Figure 3:
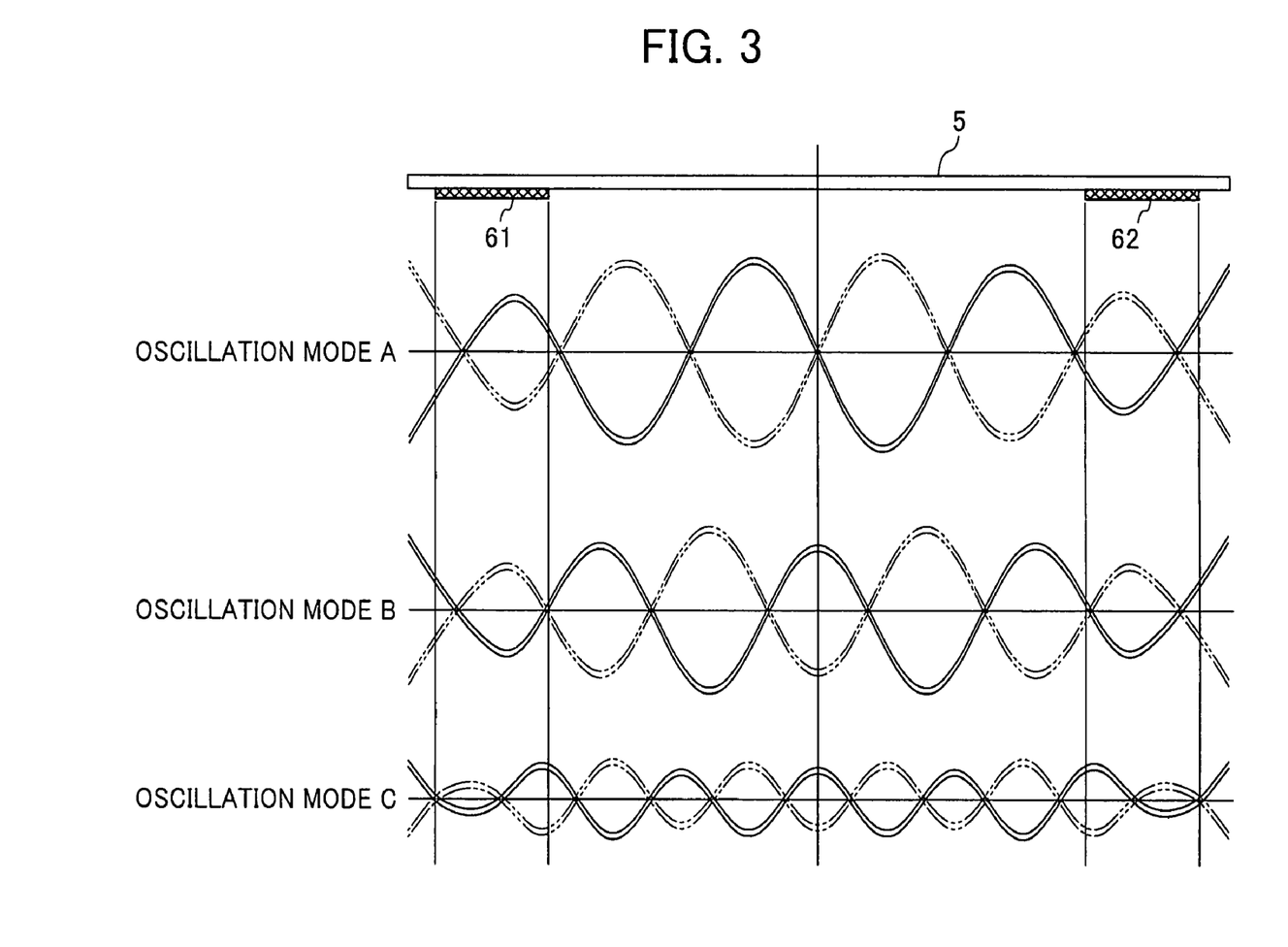
FIG. 3 is an explanatory drawing showing the oscillation forms when the optical member resonates.

Next, an explanation will be given concerning the oscillation modes and the oscillation forms of the oscillation unit 6. FIG. 3 is an explanatory drawing showing the oscillation forms when the optical member 5 resonates, and schematically shows the oscillation form when the optical member 5 is made to resonate at different resonance frequencies in each oscillation mode. In each oscillation form, one of the amplitude motions is shown by a solid line, and the other form is shown by a chain double-dashed line. Namely, according to the cycle of the of the alternating voltage applied to the piezoelectric elements 61, 62, two symmetrical amplitude forms are periodically generated.

As the resonance frequency applied to the piezoelectric elements 61, 62 becomes higher, the amplitude cycle of the oscillation form becomes shorter, and the number of antinode portions of the oscillation form becomes larger. Further, as the resonance frequency becomes lower, the amplitude cycle of the oscillation form become longer, and the number of antinode portions of the oscillation form becomes smaller. Herein, the oscillation mode A, oscillation mode B and oscillation mode C are set in order from a lower number of antinode portions. Further, in the present embodiment, in order to simplify the explanation, an example is given with 3 oscillation modes, but the number of oscillation modes may be higher. Further, the "antinode" of the oscillation form refers to the section of a peak (vicinity of the summit) of the oscillation form, and "node" refers to the section between adjacent antinodes.

For the case of removing a foreign object attached to the surface of the optical member 5, oscillations are generated according to differing resonance frequencies in the order of oscillation mode A, oscillation mode B, and oscillation mode C. In this way, it is possible to evenly generate oscillations over almost all of the effective imaging region of the optical member 5, because oscillations are generated according to the peak portions of the oscillation forms of each of oscillation modes A to C, in the effective imaging region (width direction) of the optical member 5.

Further, for each oscillation mode, the oscillation time of the oscillation unit 6 and its cycle number are set as the basic driving cycle number. For example, in the oscillation mode A, 3 cycles of a 5 second period is set as the basic driving cycle number, and each time the foreign object removal process is carried out, in the oscillation mode A, the driving is carried out with 3 cycles of 5 second periods. Also for the driving mode B and the driving mode C, respective prescribed driving times and driving cycle numbers are also set. However, these driving cycle numbers are changeable, and in the later described Embodiment 1, control is carried out such that the driving cycle number in the selected driving mode is one cycle greater than the basic driving cycle number. Further, in the later described Embodiment 2, control is carried out so that the driving voltage in the selected driving mode is 10 V higher than the basic driving voltage.

Next, an explanation will be given concerning a specific example of the case of the specification of the position of a foreign object, and the selection of oscillation modes where the specified foreign object is present at peak portions of the oscillation forms.

FIGS. 4A to 4D are explanatory drawings showing the relationship between an imaged white screen and the position of a foreign object attached to the optical member 5. In the foreign object removal process of the present embodiment, in order to detect a foreign object attached to the optical member 5, it is necessary to acquire image data of a white screen. Such image data of a white screen is obtained by fixing a bright and uniformly white photographic object at a position about 10 cm removed from the front end of the photographic lens 2, and photographing to fill the screen. In the case of executing the foreign object removal process of the present embodiment, the user acquires the image data of the white screen in advance by the above method. Further, the image data of the white screen is stored in the EEPROM 13.

Figure 4A:
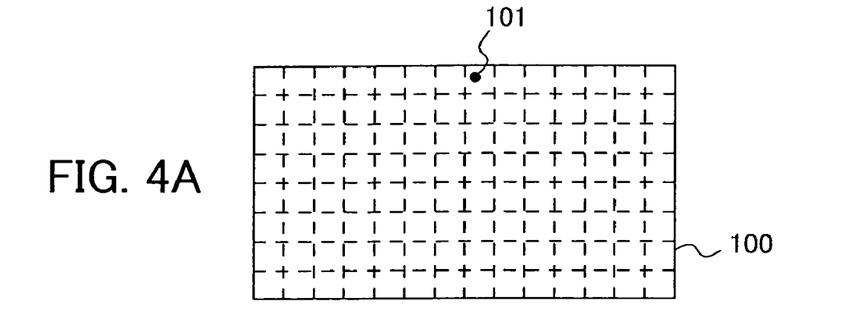
FIG. 4A is explanatory drawings showing the relationship between the photographed white screen and the position of the foreign object attached to the optical member.

FIG. 4A shows an example of an imaged white screen (the broken lines show separate regions). When a foreign object is attached to the optical member 5, for example as shown in the drawing, the image of the foreign object 101 will be taken in the effective imaging region 100. The control portion 10 analyzes the image data of the white screen by a method such as pattern recognition or the like, and if a foreign object is present, specifies in which region of the effective imaging region 100, which is divided into a plurality of regions, the foreign object is present, and stores the position information of this region in the DRAM 25.

Figure 4B:
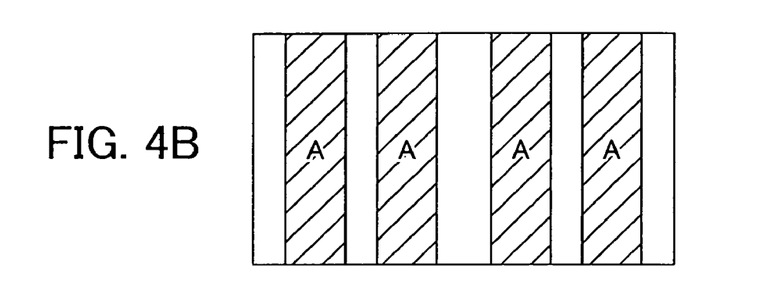
FIG. 4B is explanatory drawings showing the relationship between the photographed white screen and the position of the foreign object attached to the optical member.
Figure 4C:
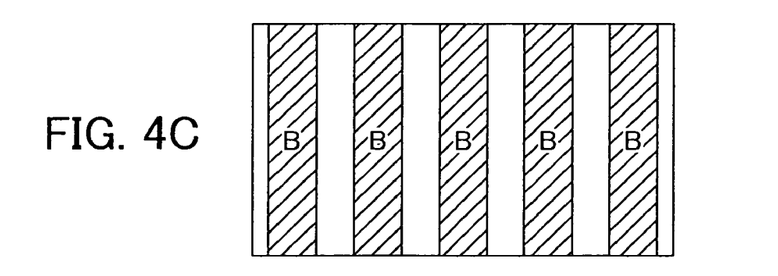
FIG. 4C is explanatory drawings showing the relationship between the photographed white screen and the position of the foreign object attached to the optical member.
Figure 4D:
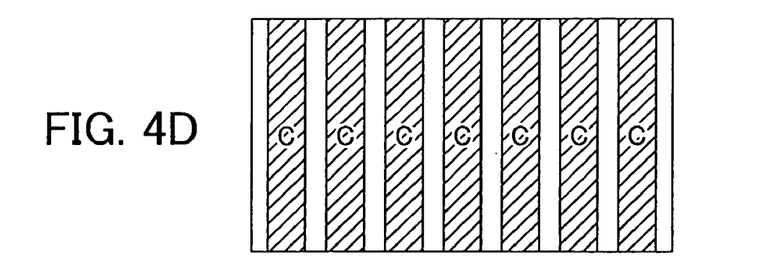
FIG. 4D is explanatory drawings showing the relationship between the photographed white screen and the position of the foreign object attached to the optical member.

Next, the control portion 10, based on the position of the specified foreign object 101, selects an oscillation mode where this foreign object 101 is present at a peak portion of the oscillation form. FIGS. 4B to 4D show the peak portions of the oscillation modes A to C shown in FIG. 3 by oblique lines, and the node portions in white. Namely, FIG. 4B shows the peak portions of the oscillation mode A, FIG. 4C shows the peak portions of the oscillation mode B, and FIG. 4D shows the peak portions of the oscillation mode C. With respect to the position of the foreign object 101 shown in FIG. 4A, the oscillation modes where this foreign object 101 is present at a peak portion of the oscillation form are the oscillation mode B and the oscillation mode C. Therefore, the control portion 10 stores in the DRAM 25 as the oscillation modes with oscillation conditions to be changed the oscillation mode B and the oscillation mode C.

Figure 5:
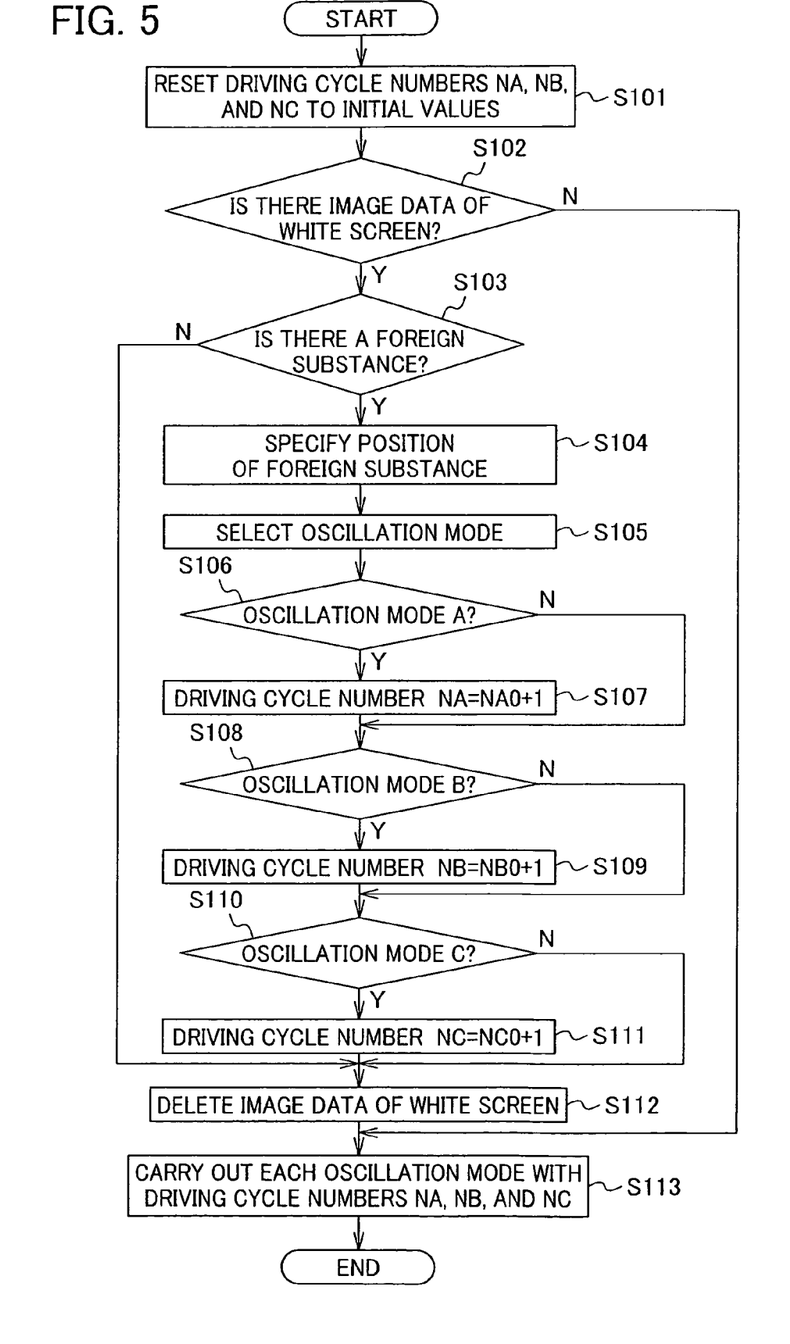
FIG. 5 is a flowchart showing the procedure for the foreign object removal process in Embodiment 1.

Next, the procedure for the foreign object removal process in Embodiment 1 is explained with reference to the flowchart shown in FIG. 5. In this Embodiment 1, the driving cycle number of an oscillation mode where the foreign object is present at a peak portion of the oscillation form is changed. Further, in FIG. 5, NA0, NB0, ad NC0 are the basic driving cycle numbers, and a prescribed cycle number is set as the initial value. Furthermore, NA, NB, and NC are the actual driving cycle numbers. If the driving cycle numbers NA, NB, and NC are not changed, then NA=NA0, NB=NB0, and NC=NC0. This foreign object removal routine is carried out by activating the foreign object removal process program stored in ROM 14.

First, the control portion 10 resets the driving cycle numbers NA, NB, and NC stored in the EEPROM 13 to the initial values (step S101). Next, it is determined whether an image of a white screen is stored in the EEPROM 13 (step S102). Here, if the determination is NO, the flow proceeds to step S113; if YES, the image of the white screen is analyzed, and it is determined whether a foreign object is present (step S103). Here, if the determination is NO, the flow proceeds to step S112; if YES, it is specified in which region of the effective imaging region this foreign object is positioned (step 104). Then, the control portion 10 selects oscillation modes where the specified foreign object is present at a peak portion of the oscillation form (step S105). In the example of the previously explained FIG. 4, because the oscillation mode B and oscillation mode C are selected, the driving cycle numbers are changed for the oscillation mode B and oscillation mode C.

Next, the control portion 10 determines whether the selected mode is the oscillation mode A (step S106). If this determination is NO, the flow proceeds to step S108; if YES, the driving cycle number NA=NA0+1 is set (step S107). Next, it is determined whether the selected mode is the oscillation mode B (step S108). If this determination is NO, the flow proceeds to step S110; if YES, the driving cycle number NB=NB0+1 is set (step S109). Next, it is determined whether the selected mode is the oscillation mode C (step S110). If this determination is NO, the flow proceeds to step S112; if YES, the driving cycle number NC=NC0+1 is set (step S111).

If the determinations of the above steps S106, 5108 and S110 are all NO, the driving cycle numbers NA, NB, and NC are left as the basic driving cycle numbers NA0, NB0, and NC0. Accordingly, even if a foreign object is present, if there is no oscillation mode where this foreign object is present at a peak portion of the oscillation form, each oscillation mode is executed according to the basic driving cycle numbers NA0, NB0, and NC0. Further, if the determination in step S103 is NO, the oscillation modes are executed with the basic driving cycle numbers NA0, NB0, and NC0.

In the example of the present embodiment, because the oscillation mode B and oscillation mode C are selected, the driving cycle number of the oscillation mode A is the initial value NA0, but the driving cycle numbers of the oscillation mode B and oscillation mode C are each set to a cycle number which is one cycle higher than the initial values. Accordingly, the control portion 10 changes the driving cycle number of NB and NC among the driving cycle numbers NA, NB, and NC stored in the EEPROM 13.

Next, the control portion 10 deletes the image data of the white screen stored in the EEPROM 13 (step S112). Then it controls the piezoelectric element driving circuit 9, and based on the driving cycle numbers NA, NB, and NC stored in the EEPROM 13, executes each oscillation mode (step S113).

According to the above described Embodiment 1, in addition to specifying the position of the foreign object based on the image data of the white screen, the driving cycle number of the oscillation modes where this foreign object is present at the peak portions of the oscillation forms are increased, therefore these portions where a foreign object is attached to the optical member 5 can be oscillated more than usual. Accordingly, foreign objects attached to the surface of the optical member 5 can be efficiently removed.

Further, in Embodiment 1, when the image data of the white screen is analyzed and a foreign object is not present, each oscillation mode is executed with the basic driving cycle numbers NA0, NB0, and NC0, therefore, fine dust which is not recognized as a foreign object and the like can also be removed. In the same way, when a foreign object is present, but there is no oscillation mode for which the foreign object is present at the peak portion of the oscillation form, each oscillation mode is executed according to the basic driving cycle numbers NA0, NB0 and NC0, and the effects of the foreign object removal according to the usual driving cycle numbers can be expected.

Further, in Embodiment 1, if the basic driving cycle numbers NA0, NB0, and NC0 are set to zero, only the oscillation modes where a foreign object is present at a peak portion of the oscillation form are executed, therefore the time required for the foreign object removal process can be shortened.

Figure 6:
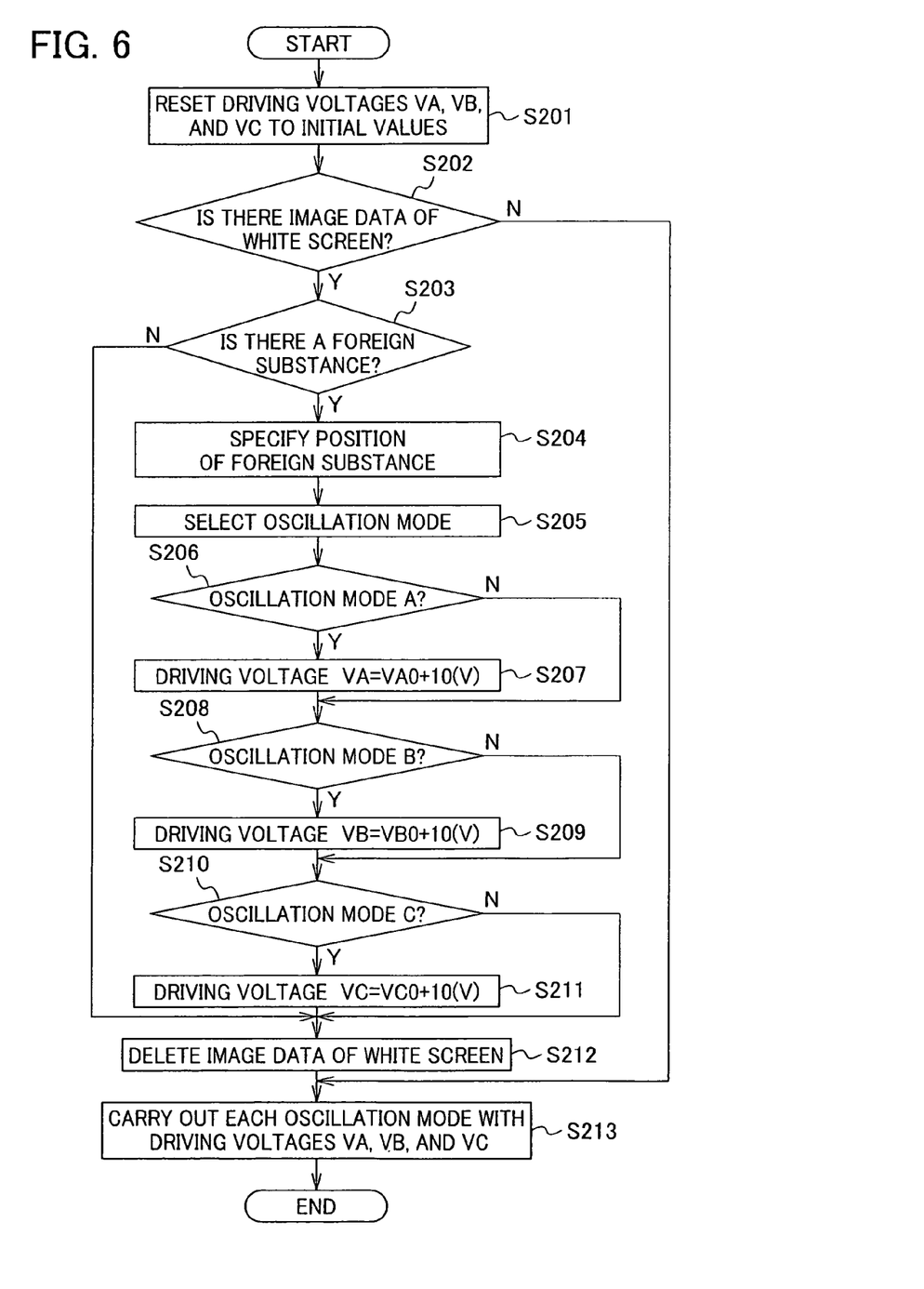
FIG. 6 is a flowchart showing the procedure for the foreign object removal process in Embodiment 2.

Next, the procedure for the foreign object removal process in Embodiment 2 is explained with reference to the flowchart shown in FIG. 6. In this Embodiment 2, the driving voltage of the oscillation modes where a foreign object is present at a peak portion of the oscillation form is changed. Further, in FIG. 6, VA0, VB0, and VC0 are the basic driving voltages (maximum value of the AC voltage), and a prescribed voltage value is set as the initial value. Further, VA, VB, and VC are the actual driving voltages. If the driving voltages VA, VB, and VC are not changed, then VA=VA0, VB=VB0, and VC=VC0. This routine of the foreign object removal process is executed by activating the foreign object removal process program stored in the ROM 14.

First, the control portion 10 resets the driving voltages VA, VB, and VC stored in the EEPROM 13 to the initial values (step S201). Next, it is determined whether image data of a white screen is stored in the EEPROM 13 (step S202). Here, if the determination is NO, the flow proceeds to step S213; if YES, the image data of the white screen is analyzed, and it is determined whether a foreign object is present (step S203). Here, if the determination is NO, the flow proceeds to step S212; if YES, it is specified in which region of the effective imaging region this foreign object is positioned (step S204). Next, the control portion 10 selects oscillation modes where the specified foreign object is present at a peak portion of the oscillation form (step S205). In the previously explained example of FIG. 4, because the oscillation mode B and oscillation mode C are selected, the driving voltages are changed for the oscillation mode B and oscillation mode C.

Next, the control portion 10 determines whether the selected mode is the oscillation mode A (step S206). If this determination is NO, the flow proceeds to step S208; if YES, the oscillation voltage VA=VA0+10 (V) is set (step S207). Next, it is determined whether the selected mode is the oscillation mode B (step S208). If this determination is NO, the flow proceeds to step 210; if YES, the oscillation voltage VB=VB0+10 (V) is set (step S209). Next, it is determined whether the selected mode is the oscillation mode C (step S210). If NO, the flow proceeds to step S212; if YES, the oscillation voltage VC=VC0+10 (V) is set (step S211).

If the determinations of the above steps S206, 5208 and S210 are all NO, the driving voltages VA, VB, and VC are left as the basic driving voltages VA0, VB0, and VC0. Accordingly, even if a foreign object is present, if there is no oscillation mode where this foreign object is present at a peak portion of the oscillation form, the oscillation modes are executed with the basic driving voltages VA0, VB0, and VC0. Further, if the determination in step S203 is NO, the oscillation modes are executed with the basic driving voltages VA0, VB0, and VC0.

In the example of the present embodiment, because the oscillation mode B and oscillation mode C are selected, the driving voltage of the oscillation mode A is the initial value VA0, but the driving voltages of the oscillation mode B and oscillation mode C are each set to 10 V higher than the initial values. Accordingly, the control portion 10 changes the driving voltage of VB and VC among the driving voltages VA, VB, and VC stored in the EEPROM 13.

Next, the control portion 10 deletes the image data of the white screen stored in the EEPROM 13 (step S212). Then it controls the piezoelectric element driving circuit 9, and based on the driving voltages VA, VB, and VC stored in the EEPROM 13, executes each oscillation mode (step S213).

According to the above described Embodiment 2, in addition to specifying the position of the foreign object based on the image data of the white screen, the driving voltages of the oscillation modes where this foreign object is present at the peak portions of the oscillation forms are increased, therefore these portions where a foreign object is attached to the optical member 5 can be oscillated with a higher amplitude than usual. In particular, in the present embodiment, the driving cycle numbers of the oscillation modes are not changed, therefore the time required for the foreign object removal process is the same as the usual time.

Further, in Embodiment 2, when the image data of the white screen is analyzed and a foreign object is not present, each oscillation mode is executed with the basic driving voltages VA0, VB0, and VC0, therefore, fine dust which is not recognized as a foreign object and the like can also be removed. In the same way, when a foreign object is present, but there is no oscillation mode for which the foreign object is present at the peak portion of the oscillation form, each oscillation mode is executed with the basic driving voltages VA0, VB0 and VC0, and the usual effects of the foreign object removal with the usual driving cycle numbers can be expected.

Further, in Embodiment 2, if the basic driving voltages VA0, VB0, and VC0 are set to zero, only the oscillation modes where a foreign object is present at a peak portion of the oscillation form are executed, therefore the time required for the foreign object removal process can be shortened.

Further, as another embodiment, in the oscillation modes where a foreign object is present at peak portions of the oscillation forms, both the driving cycle number and the driving voltage may be changed. Accordingly, in the control portion 10, control is carried out such that the driving cycle number of an oscillation mode where a foreign object is present at a peak portion of the oscillation form is made larger than the basic number, and further the driving voltage is made to be higher than the basic voltage. In this way, when both the driving cycle number and the driving voltage are changed, the portions of the optical member 5 where a foreign object is attached can be oscillated more times than usual, and with a higher amplitude than usual, and therefore foreign objects can be removed with greater efficiency.

Further, in an embodiment where both the driving cycle number and the driving voltage are changed, if both the basic driving voltage and the basic driving cycle number are set to zero, only the oscillation modes where a foreign object is present at the peak portions of the oscillation forms are executed, therefore the time required for the foreign object removal process can be further shortened.

(Modifications)

The present invention is not limited to the above explained embodiments, and many modifications and alterations such as those shown below are possible, and these also fall within the scope of the present invention.

(1) After the foreign object removal process is completed, the position information of the region where the foreign object was present is stored, and if a foreign object is confirmed to be present at the same region in the next foreign object removal process, control can be carried out such that the values of the driving cycle number and the driving voltage are further increased. In this way, for foreign objects which are not removed from the same region, more concentrated oscillations can be applied. In this case, an upper limit for the values of the driving cycle number and the driving voltage are provided, and if a foreign object is present which cannot be removed from the same region even if this upper limit is exceeded, a message suggesting that the user clean the optical member 5 with a blower brush or the like can be displayed on the liquid crystal monitor 12.

(2) In Embodiment 1, an example is shown where the driving cycle number of oscillation modes where a foreign object is present at peak portions of the oscillation form is increased by one cycle from the basic driving cycle number, but without being limited by this example, it can be changed by a greater cycle number. Further, the increase in the cycle number may differ depending on the oscillation mode.

(3) In Embodiment 2, an example is shown where the driving voltage of oscillation modes where a foreign object is present at peak portions of the oscillation form is increased by 10 (V) from the basic driving voltage, but without being limited by this example, it can be increased by a higher voltage value. Further, the increase of the voltage may differ depending on the oscillation mode.

(4) In Embodiments 1 and 2, when the image data of the white screen is analyzed and a foreign object is not present, each oscillation mode is executed with the basic driving cycle number and driving voltage, but if a foreign object is not present, after the image data of the white screen is deleted, the process may be concluded without carrying out each oscillation mode.

(5) In Embodiments 1 and 2, an example is shown where the foreign object removal process is executed by activating the foreign object removal process program stored in the ROM 14, but it is also possible to prepare a storage medium on which is recorded a program corresponding to one part of, or all of, the foreign object removal program executed by the control portion 10, insert the storage medium into the camera 1 as necessary, and read out the program recorded therein.

Further, it is possible to use appropriate combinations of the above embodiments and modifications, but detailed explanations thereof are omitted because the constituents of each of the embodiments are clarified by the drawings and explanations. Furthermore, the present invention is not limited by the above explained embodiments.

What is claimed is:

1. An imaging apparatus comprising:
    an imaging element which photoelectrically converts an image of a photographic object at a photoelectric conversion face;
    an optical member provided on side closer to the photographic object relative to the imaging element;
    an oscillation element which oscillates the optical member;
    an oscillation element driving unit which makes the oscillation element oscillate according to each of a plurality of oscillation modes having different oscillation forms;
    a foreign object specifying unit which specifies a position of a foreign object attached to the optical member; and
    an oscillation control unit configured to set a basic number of driving times no less than one corresponding to each of the plurality of oscillation modes, to select an oscillation mode that has a peak of an oscillation form at the position of the foreign object specified by the foreign object specifying unit, to increase at least one of a number of driving times and a driving voltage with respect to the oscillation mode thus selected and to execute each of the plurality of oscillation modes.

2. The imaging apparatus according to claim 1, wherein the oscillation control unit increases only the number of driving times according to a resonance frequency of the selected oscillation mode, as an oscillation condition of the selected oscillation mode.

3. The imaging apparatus according to claim 1, wherein
the oscillation control unit, based on the position of the foreign object specified by the foreign object specifying unit, changes the oscillation condition of the oscillation mode where the foreign object is present at the peak portion of the oscillation form, and does not change the oscillation condition of an oscillation mode where the foreign object is not present at the peak portion of the oscillation form.

4. A non-transitory computer readable storage medium encoded with a foreign object removal program of an imaging apparatus comprising an imaging element which photoelectrically converts an image of a photographic object at a photoelectric conversion face, an optical member provided on a side closer to the photographic object relative to the imaging element, an oscillation element which oscillates the optical member, an oscillation element driving unit which makes the oscillation element oscillate according to each of a plurality of oscillation modes having different oscillation forms, and a control portion, the storage medium including instructions for causing the control portion to execute the method comprising:

specifying a position of a foreign object attached to the optical member;

setting a basic number of driving times no less than one corresponding to each of the plurality of oscillation modes;

selecting an oscillation mode that has a peak of an oscillation form at the position of the foreign object;

increasing at least one of a number of driving times and a driving voltage with respect to the oscillation mode thus selected; and executing each of the plurality of oscillation modes.

* * * * *